Jan. 14, 1930. L. LÖWY 1,743,223
ROLLER CONVEYER
Filed May 4, 1928
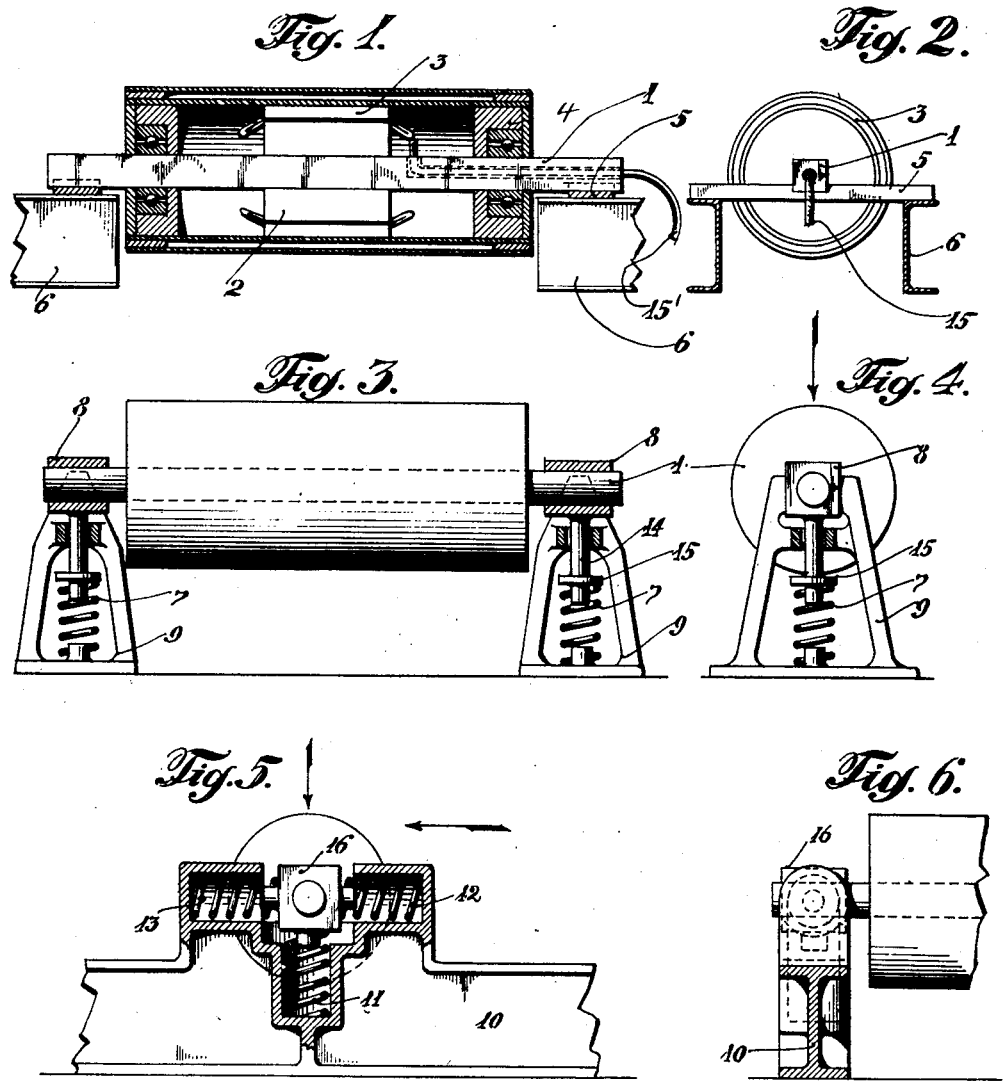

Patented Jan. 14, 1930

1,743,223

UNITED STATES PATENT OFFICE

LUDWIG LÖWY, OF DUSSELDORF, GERMANY

ROLLER CONVEYER

Application filed May 4, 1928. Serial No. 275,233.

My invention relates to roller conveyers, more particularly such as are used in rolling mills. Such roller conveyers often have to resist heavy shocks due to slabs and billets dropping down on them. This is especially the case with tables near the furnaces in rolling mills and all tables in front and behind the mill housings. The old conveyers provided with gear-drives and having a line shaft extending along the table must be made very rugged in order to be able to resist those shocks which eventually result in their being destroyed, and this is also true of roller conveyers provided with individual motors outside the rollers, as they are rigidly mounted on a base plate supporting the roller and the motor.

Now, the object of the present invention is to avoid the harmful results of the shocks, and the manner in which this is accomplished will now be described with reference to the annexed drawing, in which Fig. 1 is a central longitudinal section through a motor roller constructed with an inside motor and a yieldingly supported stationary shaft; Fig. 2 is an end-view thereof showing the yielding support; Fig. 3 is an elevational view of a motor roller showing a modification of the yielding support, the bearings for the stationary shaft being shown in section; Fig. 4 is an end-view thereof; Fig. 5 is a similar end-view showing a further modification of the yielding support, while Fig. 6 is a fragmentary elevational view of Fig. 5, partly in section, at right angles to Fig. 5 when seen in the direction of the horizontal arrow.

In the construction shown in Figs. 1 and 2,—1 is the stationary shaft, 2 the motor stator and 3 the rotor element composed of one or more parts and rotatably journalled on said shaft by means of bearings 4 supported by said shaft.

At 15' is shown a flexible cable for supplying the electric current to the motor. Each motor roller is a complete unit entirely independent of the adjacent motor rollers constituting the conveyer. As shown more especially in Fig. 2, the stationary shaft 1 is supported by a flat spring-blade 5, which at its ends rests on girders, or standards, 6.

Figs. 3 and 4 show a modified elastic support for the stationary shaft 1 of the motor roller. As shown in said figures, there are mounted on the ends of said shaft bearing blocks 8 from which extends downwardly a bolt-like projection 14 to which is secured a collar 15. 9 is a housing enclosing a helical spring 7 bearing against the bottom of said housing and against said collar, the bolt 14 projecting to some extent into said spring. The bearing blocks 8 being slidably mounted in the top of housing 9, any shocks received by the stationary shaft will be transmitted to the springs 7.

Fig. 5 shows a construction permitting shocks imparted to the shaft from various directions to be elastically absorbed. At 10 is shown a portion of a girder provided with housings for three helical springs, one spring 11, being vertically disposed and two springs 12 and 13, horizontally. The ends of the springs bear against bearing blocks provided on the ends of the stationary shaft 1, one of said blocks being shown at 16. This construction is especially designed for conveyer rollers of lifting and tilting tables of three-high rolling mills, and of operating conveyer tables in front and at rear of two-high reversing mills, the construction permitting the rollers to be elastically supported in all directions. This elastic or yielding mounting of the motor rollers does not in any way interfere with the rollers being exchanged, if that should become for some reason necessary, or be desirable.

The invention has been shown only by way of illustration, and therefore, I do not, of course, limit myself to the details of those constructions, since other modifications can be devised without a departure from the invention.

I claim:

1. In a conveyer of the type described consisting of a plurality of motor rollers each comprising a stationary shaft, a stator secured thereto and an outer rotatable roller part and carried by said stationary shaft so as to leave a uniform air space between said rotor and said stator, the combination with said stationary shaft, of means yieldingly and resiliently supporting the same for maintaining said uniform air space unimpaired.

2. In a conveyer of the type described consisting of a plurality of motor rollers each comprising a stationary shaft, a stator secured thereto and an outer rotatable roller part and rotor carried by said stationary shaft so as to leave a uniform air space between said rotor and said stator, the combination with said stationary shaft and a support therefor, of elastic means intermediate said stationary shaft and said support for the purpose of maintaining said air space unimpaired.

3. In a conveyer of the type described consisting of a plurality of motor rollers each comprising a stationary shaft, a stator secured thereto, an outer rotatable roller part and rotor carried by said stationary shaft so as to leave a uniform air space between said rotor and said stator, the combination with said stationary shaft and bearing blocks provided at the ends of said shaft, of housings, and helical springs enclosed in said housings for elastically supporting said bearing blocks for the purpose of maintaining said air space unimpaired.

4. The combination as specified in claim 3, in which said bearing blocks are provided with bolt like projections adapted to extend into said springs, including collars provided on said projections so as to form abutments for said springs.

5. In a conveyer consisting of a plurality of motor rollers each comprising a relatively stationary shaft, an outer rotatable roller part rotatably journalled on said shaft and electric motor stator and rotor elements respectively carried by said stationary and rotatable parts, the combination with said stationary shaft, of bearing blocks mounted on the ends of said shaft, housings, and springs in said housings engaging said blocks so as to elastically support the same in all directions.

6. In a conveyer of the type described consisting of a plurality of motor rollers each comprising a stationary shaft, a stator secured thereto and an outer rotatable roller part and rotor carried by said stationary shaft so as to leave a uniform air space between said rotor and said stator, the combination with said stationary shaft and bearings therefor provided at the ends of said shaft, of housings and springs in said housings so disposed therein as to elastically support said bearings in all directions for the purpose of maintaining said uniform air space unimpaired.

In testimony whereof I affix my signature.

LUDWIG LÖWY.